United States Patent
Walley et al.

(10) Patent No.: US 12,512,876 B2
(45) Date of Patent: Dec. 30, 2025

(54) WIRELESS POWER TRANSFER WITH IN-BAND PREAMBLE MONITORING AND CONTROL

(71) Applicant: Avago Technologies International Sales Pte. Limited, Singapore (SG)

(72) Inventors: John Walley, Ladera Ranch, CA (US); Marc Keppler, Windsor, CO (US); Jim Le, Fort Collins, CO (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 604 days.

(21) Appl. No.: 17/900,724

(22) Filed: Aug. 31, 2022

(65) Prior Publication Data

US 2024/0072580 A1 Feb. 29, 2024

(51) Int. Cl.
| | |
|---|---|
| *H04B 5/79* | (2024.01) |
| *H02J 50/80* | (2016.01) |
| *H04B 5/72* | (2024.01) |
| *H04L 27/04* | (2006.01) |
| *H04L 27/12* | (2006.01) |

(52) U.S. Cl.
CPC .......... *H04B 5/79* (2024.01); *H02J 50/80* (2016.02); *H04B 5/72* (2024.01); *H04L 27/04* (2013.01); *H04L 27/12* (2013.01)

(58) Field of Classification Search
CPC ...................................................... H04B 5/79
USPC ............................................................ 320/108
See application file for complete search history.

(56) References Cited

U.S. PATENT DOCUMENTS

| | | |
|---|---|---|
| 5,930,304 A | 7/1999 | Hollenbeck et al. |
| 8,144,815 B2 | 3/2012 | Norris |
| 9,935,681 B2 | 4/2018 | Lingam et al. |
| 11,095,170 B1 | 8/2021 | Wang |

(Continued)

FOREIGN PATENT DOCUMENTS

EP 1570606 A1 9/2005

OTHER PUBLICATIONS

Aguilar-Torrentera Jorge, Wireless Synchronization Preamble Detection Scheme Using Bispectra-Based Statistics in the Presence of Stationary Noise, Ingenieria, Investigación y Tecnologia, vol. 16, Issue 3, 2015, pp. 383-390, ISSN 1405-7743, https://doi.org/10.1016/j.riit.2015.05.011.

(Continued)

*Primary Examiner* — Jerry D Robbins
(74) *Attorney, Agent, or Firm* — Quarles & Brady LLP

(57) ABSTRACT

A wireless power transfer device may include a circuit couplable with a coil to transmit or receive a first signal providing wireless power through the coil. The first signal may be modulated with second signals. A packet within any of the second signals may include first bits associated with a preamble and second bits associated with data. The device may further include a controller to measure temporal variations of at least one of the first signal, a rectified version of the first signal, or the one or more second signals. The controller may further determine thresholds for distinguishing between bits in the packet based on the temporal variations. The device may further demodulate the signals using the one or more thresholds to identify the preamble of the packet and extract the second bits associated with data from the packet when the preamble of the packet is identified.

18 Claims, 3 Drawing Sheets

(56) References Cited

U.S. PATENT DOCUMENTS

| | | | |
|---|---|---|---|
| 2003/0194023 A1 | 10/2003 | Nakano | |
| 2005/0063488 A1 | 3/2005 | Troyk et al. | |
| 2013/0026981 A1* | 1/2013 | Van Der Lee | H04B 5/79 |
| | | | 320/108 |
| 2013/0272147 A1* | 10/2013 | Vermani | H04B 7/0689 |
| | | | 370/252 |
| 2017/0019226 A1 | 1/2017 | Yonge, III et al. | |
| 2017/0373537 A1* | 12/2017 | Dayal | H02J 7/00034 |
| 2018/0351392 A1 | 12/2018 | Malkin et al. | |
| 2019/0109739 A1 | 4/2019 | Oettinger | |
| 2019/0190765 A1 | 6/2019 | Murali et al. | |
| 2019/0238000 A1* | 8/2019 | Salvekar | H02J 50/80 |
| 2019/0393734 A1* | 12/2019 | Zhou | H02J 50/12 |
| 2021/0044152 A1 | 2/2021 | Park et al. | |
| 2021/0367457 A1 | 11/2021 | Sherman | |

OTHER PUBLICATIONS

Jan. 22, 2024 Extended EP Search Report, 10 pages.

* cited by examiner

WIRELESS POWER TRANSFER WITH IN-BAND PREAMBLE MONITORING AND CONTROL

TECHNICAL FIELD

The present disclosure relates generally to in-band communication in a wireless power transfer system and, more particularly, to preamble monitoring and control of in-band communication in a wireless power transfer system.

BACKGROUND

Wireless power transfer (WPT) systems may provide for both wireless power transfer across coils and for the transfer of data across the coils, which is referred to as in-band communication. The data transferred across the coils using such in-band communication typically includes preamble bytes and data bytes. In some implementations, data bytes are only decoded after successful decoding of the preamble bytes. Efficient in-band communication requires a proper setting of a threshold for distinguishing between high and low bits of the preamble bytes, which may be referred to as a preamble threshold. An improper preamble threshold may result in missed data and/or premature packet detection.

SUMMARY

A device is disclosed in accordance with one or more illustrative embodiments. In one illustrative embodiment, the device includes a first circuit couplable with a coil to at least one of transmit or receive a first signal providing wireless power through the coil, where the first signal is further modulated with one or more second signals associated with one or more communication channels through the coil. In another illustrative embodiment, a packet within any of the one or more second signals includes one or more first bits associated with a preamble and one or more second bits associated with data. In another illustrative embodiment, the device includes a controller. In another illustrative embodiment, the controller measures temporal variations of at least one of the first signal, a rectified version of the first signal, or the one or more second signals. In another illustrative embodiment, the controller determines one or more thresholds for distinguishing between at least one of the one or more first bits or the one or more second bits in the packet based on the temporal variations. In another illustrative embodiment, the device includes a second circuit to demodulate the one or more second signals using the one or more thresholds to identify the preamble of the packet and extract the one or more second bits associated with the data from the packet when the preamble of the packet is identified.

A device is disclosed in accordance with one or more illustrative embodiments. In one illustrative embodiment, the device includes a first circuit couplable with a coil to at least one of transmit or receive a first signal providing wireless power through the coil, where the first signal is further modulated with one or more second signals associated with one or more communication channels through the coil. In another illustrative embodiment, a packet within any of the one or more second signals includes one or more first bits associated with a preamble and one or more second bits associated with data. In another illustrative embodiment, the device includes a rectifier to generate a rectified version of the first signal. In another illustrative embodiment, the device includes a controller. In another illustrative embodiment, the controller measures temporal variations of at least one of the first signal, the rectified version of the first signal, or the one or more second signals. In another illustrative embodiment, the controller determines one or more thresholds for distinguishing between at least one of the one or more first bits or the one or more second bits in the packet based on the temporal variations. In another illustrative embodiment, the device includes a second circuit to demodulate the one or more second signals using the one or more thresholds to identify the preamble of the packet and extract the one or more second bits associated with the data from the packet when the preamble of the packet is identified.

A method is disclosed in accordance with one or more illustrative embodiments. In one illustrative embodiment, the method includes receiving a first signal providing wireless power through a coil, where the first signal is further modulated with one or more second signals associated with one or more communication channels through the coil. In another illustrative embodiment, a packet within any of the one or more second signals includes one or more first bits associated with a preamble and one or more second bits associated with data. In another illustrative embodiment, the method includes measuring temporal variations of at least one of the first signal, a rectified version of the first signal, or the one or more second signals. In another illustrative embodiment, the method includes determining one or more thresholds for distinguishing between at least one of the one or more first bits or the one or more second bits in the packet based on the temporal variations. In another illustrative embodiment, the method includes demodulating the one or more second signals using the one or more thresholds to identify the preamble of the packet. In another illustrative embodiment, the method includes extracting the one or more second bits associated with the data from the packet when the preamble of the packet is identified.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1A:
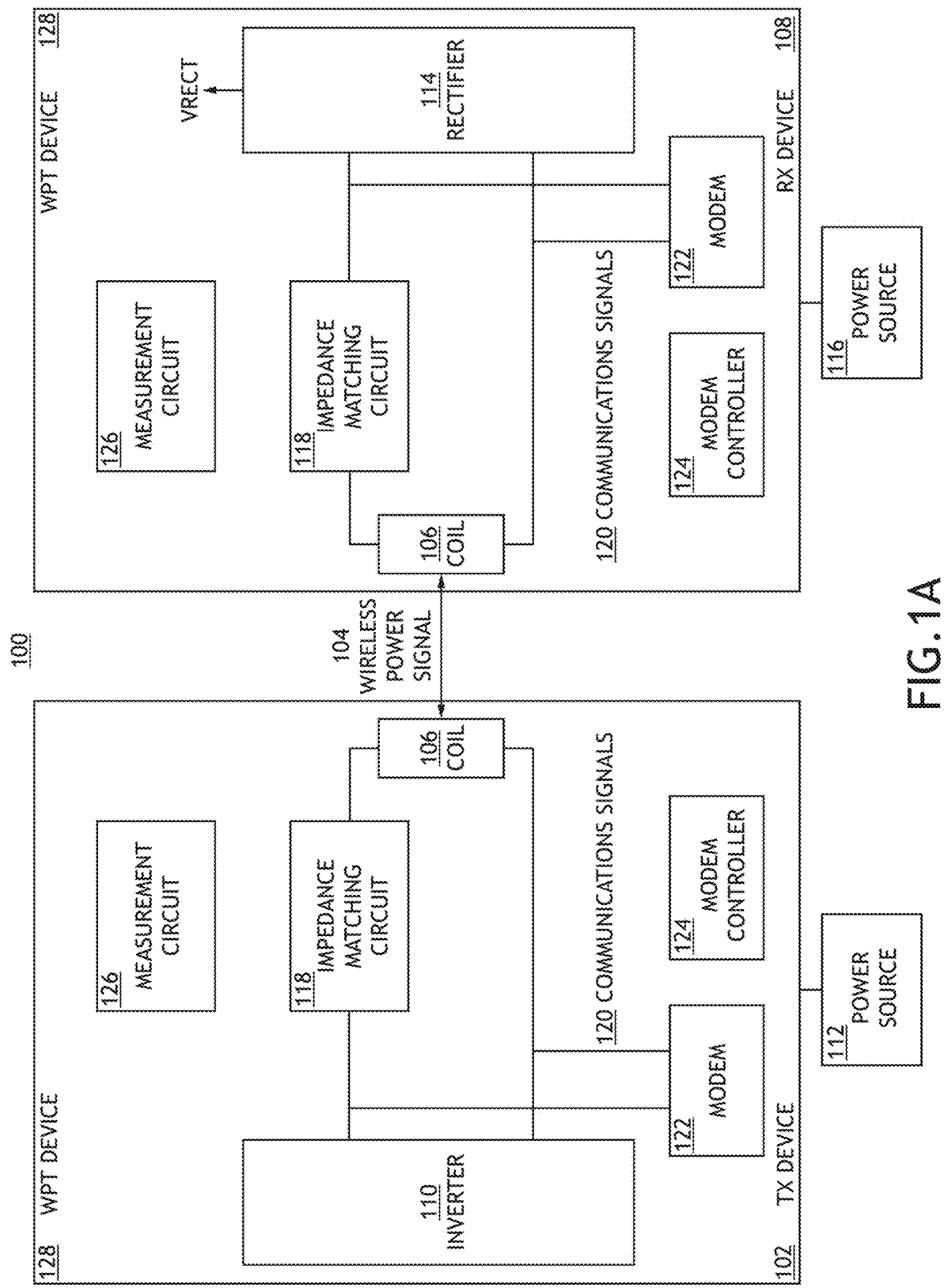
FIG. 1A is a simplified schematic of a WPT system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

As used herein, directional terms such as "top," "bottom," "over," "under," "upper," "upward," "lower," "down," and "downward" are intended to provide relative positions for purposes of description and are not intended to designate an absolute frame of reference. Various modifications to the described embodiments will be apparent to those with skill in the art, and the general principles defined herein may be applied to other embodiments. Similarly, descriptions that a particular element is "fabricated over" another element (alternatively "located on," "disposed on," or the like) indicates a relative position of such components but does not necessarily indicate that such elements are physically in contact. Such elements may be in physical contact or may alternatively include intervening elements.

When an element (or component) is referred to herein as being "connected" (or "interconnected") or "coupled" to another element, it is to be understood that the elements can be directly connected to the other element or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present. Further, when a first element is referred to herein as being "configured to be connected" to a second element, it is to be understood that these elements need not be located on a common device or circuit. For example, such first and second elements may be separately packaged.

The phrase "at least one of" is used herein to refer to an open-ended listing of elements. For example, the phrase "at least one of A, B, or C" may refer to any combination of elements A, B, and/or C alone or in combination. Further, the phrase "at least one of" does not preclude additional elements. Additionally, the terms "comprising" and "including" are used interchangeably herein to refer to open-ended descriptions of components. For example, a description that a first component comprises (or includes) a second component may indicate that the first component comprises, but is not limited to, the second element. In this way, such a first element may or may not comprise additional elements.

A WPT system may include a transmission (TX) device having a first coil (e.g., a TX coil) and a reception (RX) device having a second coil (e.g., an RX coil). Wireless power may be transferred between or through the coils using any suitable technique including, but not limited to, magnetic resonance coupling between the coils. For example, a time-varying or oscillating signal (referred to herein as a transmitted wireless power signal) may be applied to the TX coil, which may induce a corresponding time-varying or oscillating current (e.g., a received wireless power signal) in the RX coil. The wireless power signal may include any time-varying or oscillating signal suitable for providing power transfer through the coils. In some embodiments, the wireless power signal conforms to one or more standardized or selected frequency bands. In this way, the wireless power signal may have a carrier frequency and may have a limited bandwidth to conform to the selected frequency band.

A WPT system may further include one or more components suitable for the transfer of data through the coils through modulation of the wireless power signal, which is referred to herein as in-band communication. A signal containing data to be transferred through such in-band communication is referred to as a communications signal. For example, the TX device and/or the RX device may include at least one modem for the transmission and/or reception of communications signals across the coil. Further, the communications signals may be encoded using any suitable technique including, but not limited to, amplitude shift keying (ASK) or frequency shift keying (FSK).

A communications signal may include at least one or more preamble bits and one or more data bits that contain information to be transferred (e.g., a payload, or the like). In this way, a receiver for the communications signals may monitor received communications signals for the preamble bits to determine whether data is being transmitted. Upon successful detection of the preamble bits, the receiver may decode the data bits to recover the payload.

Embodiments of the present disclosure are directed to systems and methods for monitoring and control of communications signals, particularly thresholds for distinguishing between bits in a communications signal, which are referred to herein as preamble thresholds.

A communications signal may be modulated with any technique known in the art. In a general sense, a modulated signal may include a series of bits transmitted at a baud rate (e.g., a bit rate, or the like), where a bit is an informational unit that may have one of several allowable bit values. For example, two-bit modulation may allow bits with two possible values, which may correspond to logical values of "0" and "1." As another example, four-bit modulation may allow bits with four possible values corresponding to logical values of "00," "01," "10," and "11."

Different modulation schemes encode bit values using different techniques. For example, ASK modulation encodes bit values as different amplitudes (e.g., voltages in a circuit) of a signal having a constant carrier frequency. In this way, the detection of the bits may be performed by comparing an amplitude of a received communications signal at a given time to one or more amplitude thresholds (e.g., voltage thresholds). As another example, FSK modulation encodes bit values as different frequencies of a signal having a constant amplitude. In this way, the detection of the bits may be performed by comparing a frequency of a received communications signal at a given time to one or more frequency thresholds.

Many existing WPT systems utilize predetermined and static preamble thresholds. However, it is contemplated herein that it may be desirable to dynamically adjust the preamble thresholds. For example, communications signals for in-band communication may be influenced by multiple sources of noise, some of which may vary over time due to variations in operating conditions such as, but not limited to, relative positions of the coils in the TX and RX devices. It is further contemplated herein that such noise sources may impact suitable preamble thresholds. In this way, monitoring and control of the preamble thresholds may enable robust in-band communication in a wide range of operating conditions and/or during dynamically changing operating conditions.

In some embodiments, a WPT device (e.g., a TX device or an RX device) suitable for receiving communications signals may measure temporal variations of a modulated parameter (e.g., voltage, frequency, or the like) of at least one of a received communications signal or a wireless power signal (e.g., that is modulated with the communications signal) and may further determine preamble thresholds based on the temporal variations. The temporal variations may correspond to any time-varying (e.g., time-averaged) metric over any selected time interval including, but not limited to, a root mean square (RMS) of the modulated parameter, a maximum of the modulated parameter, a minimum of the modulated parameter, an offset value (e.g., a non-varying or direct current (DC) value), or any other suitable value. Such temporal variations may be indicative of noise variations in the communications signal and may be used to adjust the preamble thresholds to accommodate the noise. Further, a measurement signal based on these temporal variations (e.g., a time-averaged signal, or the like) may provide a measurement of a modulation depth in the presence of noise when two-bit modulation is used. In particular, the measurement signal may correspond to a half-way point between a first bit value and a second bit value in the presence of noise. In this way, the preamble threshold may be set to a value of the measurement signal.

In some embodiments, communications signals are buffered (e.g., delayed) while preamble thresholds are determined. In this way, a receiving device may determine preamble thresholds based on communications signals in a buffer and then apply these thresholds to the communications signals upon exiting the buffer. Put another way, a device receiving the communications signals may wait a buffer interval prior to determining the preamble thresholds, where the buffer interval is equal or greater than a time required to determine the preamble thresholds. In this way, the preamble thresholds for a particular bit (or series of bits) may be determined based on an analysis of surrounding bits (e.g., past and/or future bits). In some embodiments, one or more aspects of a preamble are monitored and/or adjusted. Accordingly, a receiver of communications signal may either include multiple preamble detectors tuned to detect different preamble variations and/or may receive notice of an upcoming preamble variation prior to a change (e.g., via communication with an existing or default preamble). For example, the length and/or content of the preamble may be varied to facilitate robust operation. As an illustration, the sequence of preamble bits (e.g., the values of the bits that make up the preamble) may be varied. For instance, some communication protocols may utilize a preamble formed with an alternating sequence of high and low bits. However, a random or pseudo-random sequence of bits may enable more robust detection. For example, a pseudo-random sequence of bits may be generated using deterministic techniques, but may satisfy one or more statistical requirements. As another illustration, a length of the preamble (e.g., a number of preamble bits) may be varied.

In some embodiments, conditions for successful detection of a preamble are adjusted. For example, some communication protocols may require correct detection of all preamble bits before decoding data bits. In some embodiments, conditions for successful detection of a preamble are relaxed. As an illustration, a correlation detector may be used. In this way, data bits may be decoded upon detection of a selected percentage of preamble bits that is lower than 100 percent. Further, a correlation detector in combination with a pseudo-random preamble (e.g., a pseudo-random sequence of bits) may also provide robust detection of the preamble and thus robust detection of the state of the data bits.

In some embodiments, a baud rate (e.g., a rate at which bits change, a bit rate, or the like) associated with a communications signal is monitored and/or adjusted. Such a configuration may be suitable for systems suitable for operation at multiple baud rates. For example, a WPT device may detect a baud rate and/or may include multiple modems operational at different baud rates. As another example, multiple preamble detectors may be tuned to different baud rates.

Figure 1B:
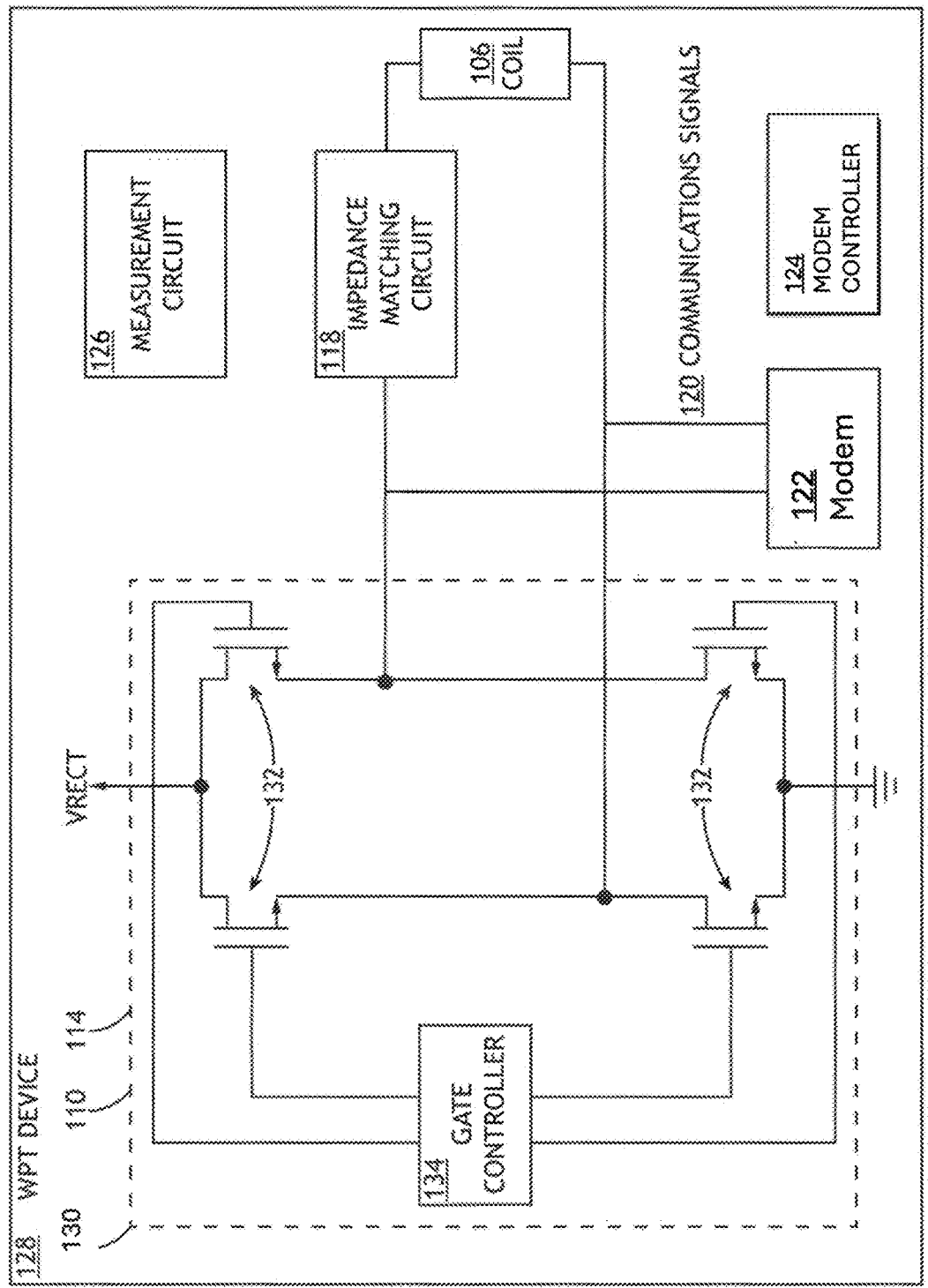
FIG. 1B is a simplified schematic of a WPT device suitable for selective operation as either a transmission (TX) device or a reception (RX) device, in accordance with one or more embodiments of the present disclosure.
Figure 2:
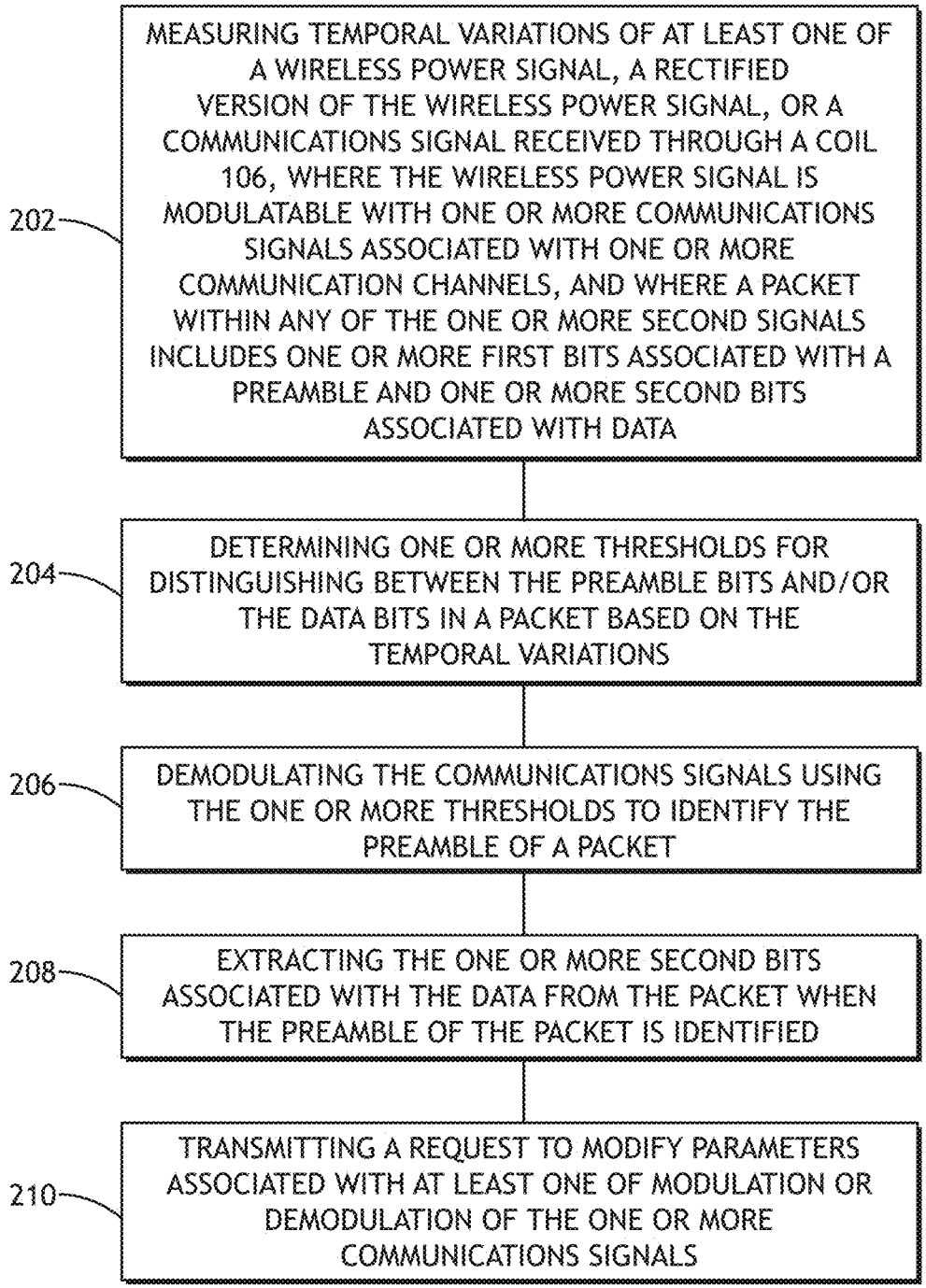
FIG. 2 is a flow diagram illustrating steps performed in a method, in accordance with one or more embodiments of the present disclosure.

Referring now to FIGS. 1A-2, systems and methods for monitoring and control of preambles for in-band communication in a WPT system are described in greater detail, in accordance with one or more embodiments of the present disclosure. Components of a circuit may be connected in any suitable arrangement. For example, components connected in series may provide a single path for the flow of current and may further have the same current flowing through them. As another example, components connected in parallel may share a common input node and a common output node, where current entering the input node is split between the components. Further, a voltage drop across components connected in parallel may be equal.

FIG. 1A is a simplified schematic of a WPT system 100, in accordance with one or more embodiments of the present disclosure.

In some embodiments, the WPT system 100 includes a TX device 102 to generate a wireless power signal 104 and transmit the wireless power signal 104 through a coil 106 (e.g., a TX coil 106). The WPT system 100 may further include an RX device 108 to receive the wireless power signal 104 through a coil 106 (e.g., an RX coil 106). The coil 106 may include any component suitable for sending or receiving wireless power such as, but not limited to, an inductor formed as one or more turns of wire or an antenna.

In some embodiments, the TX device 102 includes one or more circuits to generate the wireless power signal 104 having a particular carrier frequency. For example, the TX device 102 illustrated in FIG. 1 includes an inverter 110 to generate a time-varying wireless power signal 104 from a direct current (DC) signal from a power source 112.

The power source 112 may include any source suitable for powering the TX device 102. In some embodiments, the power source 112 is an alternating current (AC) source coupled with a rectifier. In some embodiments, the power source 112 is a DC source such as, but not limited to, a battery. Further, the power source 112 may be internal to the TX device 102 (e.g., in the case of a battery) or external to the TX device 102 (e.g., in the case of an AC source).

In some embodiments, the RX device 108 includes one or more circuits to convert a received time-varying wireless power signal 104 from the RX coil 106 to a DC signal, which is referred to herein as VRECT. For example, the RX device 108 may include a rectifier 114 as illustrated in FIG. 1A. The rectifier 114 may include any combination of components suitable for converting an AC voltage to a DC voltage including, but not limited to, one or more transistors or one or more diodes. An output signal generated by the rectifier 114 (e.g., a DC voltage signal) is referred to herein as a rectified signal or a rectified version of an input signal (e.g., a rectified version of an AC voltage signal).

The RX device 108 may further be connected to a power source 116. The power source 116 may include any source suitable for powering the RX device 108 any components therein. In some embodiments, the power source 116 is an AC source coupled with a rectifier. In some embodiments, the power source 116 is a DC source such as, but not limited to, a battery.

As illustrated in FIG. 1A, the TX device 102 and/or the RX device 108 may include an impedance matching circuit 118 for tuning an impedance of the TX device 102 and/or the RX device 108 as seen through an associated coil 106. The impedance matching circuit 118 may include any combination of components suitable for tuning impedance including, but not limited to, one or more capacitors or one or more inductors. For example, the impedance matching circuit 118 may include one or more capacitors in series with the coil 106.

In some embodiments, the TX device 102 and/or the RX device 108 may further establish one or more wireless communication channels for the transmission and/or reception of data in the form of communications signals 120. For example, the TX device 102 and/or the RX device 108 may include a modem 122 (e.g., one or more circuits more generally) to modulate and/or demodulate the wireless power signal 104 with one or more communications signals 120. Put another way, the wireless power signal 104 may be modulatable with the one or more communications signals 120 for the transmission and/or reception of data. As used herein, the term modulate is used to refer to varying a first signal (e.g., a carrier signal, or the like) with a second signal including information to be transmitted with the effect of encoding the first signal with the information to be transmitted. The term demodulate is used to refer to extracting the second signal (or the information therein) from the modulated first signal. As an illustration, the wireless power signal 104 may correspond to an AC signal having a carrier frequency, where at least one of an amplitude or a frequency of this AC signal modulated (or modulatable) with one or more communications signals 120 to provide for communication over at least one communication channel.

The wireless communication channels between TX device 102 and the RX device 108 may be unidirectional or bi-directional. In this way, TX device 102 and the RX device 108 may each be a transmitter or a receiver of communications signals 120 regardless of the direction of wireless power transfer.

A communication channel may include any pathway and/or communication protocol suitable for the transmission of data. In some embodiments, at least one communication channel is formed between a TX coil 106 and an RX coil 106.

In some embodiments, a communications signal 120 includes one or more packets associated with data to be transmitted over a communication channel (e.g., through the coil 106). For example, a packet may include a series of bits to be transmitted over the communication channel. In some embodiments, a packet includes a preamble including one or more preamble bits and further includes one or more data bits (e.g., bits associated with data). In this way, the preamble bits may facilitate identification of a packet of data, provide header information, and/or provide routing information, while the data bits may include information (e.g., data) to be transmitted (e.g., a payload).

In some embodiments, a preamble includes a predefined sequence of bits (e.g., preamble bits having a predefined sequence of bit values). For example, the preamble includes an alternating sequence of bits with two bit values (e.g., a pattern of 101010 . . . ). As another example, the preamble includes at least one of a random or pseudo-random sequence of bits. As will be described in greater detail below, a preamble including at least one of a random or pseudo-random sequence of bits (e.g., a non-alternating pattern) may facilitate more robust identification of a packet than an alternating sequence of bits with two bit values.

A modem 122 may include one or more circuits with any component or combination of components suitable for modulating and/or demodulating communications signals using any modulation technique including, but not limited to, amplitude shift keying (ASK) or frequency shift keying (FSK). In this way, the TX device 102 and/or the RX device 108 may transmit and/or receive information such as, but not limited to, identifying information, configuration information, status indicators, or the like. The TX device 102 and/or the RX device 108 may further transmit requests and/or control signals through the one or more communication channels to request and/or control operations from each other.

Further, different modulation techniques may be used for different wireless communication channels and/or communication directions. As an illustration, the TX device 102 may utilize FSK modulation for communications signals 120 directed to the RX device 108. In this configuration, the TX device 102 may modulate the carrier frequency of the wireless power signal generated by the inverter 110 using FSK modulation, while the RX device 108 may receive and demodulate the communications signals 120 using any suitable circuit such as, but not limited to, a circuit associated with the rectifier 114. As another illustration the RX device 108 may utilize ASK modulation for communications signals 120 directed to the TX device 102. In this configuration, the modem 122 of the RX device may generate ASK modulated carrier signals by modulating a load across the input or output of the rectifier 114. The TX device 102 may then receive and demodulate the communications signals 120 using any suitable technique such as, but not limited to, monitoring a voltage and/or a current across the impedance matching circuit 118 or the coil 106.

In some embodiments, the TX device 102 and/or the RX device 108 include a modem controller 124 (e.g., a controller more generally) coupled to the modem 122. In some embodiments, the modem controller 124 performs one or more steps associated with monitoring and/or controlling a preamble threshold that may be used by the modem 122. The modem controller 124 may broadly include any device having one or more processing or logic elements (e.g., one or more micro-processor devices, one or more application specific integrated circuit (ASIC) devices, one or more field programmable gate arrays (FPGAs), or one or more digital signal processors (DSPs)). In this way, the modem controller 124 may execute program instructions located on a memory device. The memory device may include any storage medium known in the art suitable for storing program instructions executable by the associated with the one or more processors. For example, the memory device may include a non-transitory memory medium. By way of another example, the memory may include, but is not limited to, a read-only memory (ROM), a random-access memory (RAM), a magnetic or optical memory device (e.g., disk), a magnetic tape, a solid-state drive, or the like.

In some embodiments, the modem 122 and/or the modem controller 124 are suitable for multi-baud rate communication. For example, the modem 122 and/or the modem controller 124 may be configured to identify a baud rate of a received communications signal 120 based on an analysis of the communications signal 120 (e.g., an average detected transition between bit values, a shortest detected transition between bit values, or the like). As another example, the modem 122 and/or the modem controller 124 may be configured to duplicate at least some operations for different baud rates. The modem 122 and/or the modem controller 124 may then determine a current baud rate used by any particular communication channel using any technique known in the art. As an illustration, the modem 122 and/or the modem controller 124 may analyze a number of correctly identified packets demodulated based on different baud rates. In another illustration, the modem 122 and/or the modem controller 124 may utilize correlation detection on the preamble at different baud rates and verify the output using any technique (e.g., with a checksum, a cyclic redundancy check (CRC), or the like).

In some embodiments, the TX device 102 and/or the RX device 108 include one or more measurement circuits 126 such as, but not limited to, a current sense circuit to measure current (e.g., electrical current) or a voltage sense circuit to measure voltage. A TX device 102 and/or the RX device 108 may generally include any number or type of measurement circuits 126 suitable for providing measurements at any location within associated circuits. For example, one or more measurement circuits 126 may be used to measure the current and/or voltage of a coil 106 of a TX device 102 and/or the RX device 108. In this way, transmitted and received wireless power associated with the wireless power signal 104 may be measured. Such measurements may be useful for, but are not limited to, determining a power transmission efficiency across the coils. As another example, one or more measurement circuits 126 may be used to measure the current and/or voltage provided by the rectifier 114 of an RX device 108. Such measurements may be useful for, but are not limited to, characterizing an efficiency of the rectifier 114.

It is contemplated herein that the TX device 102 and the RX device 108 may be formed from similar components. Accordingly, a single device may be designed to function either as a TX device 102 or as an RX device 108.

As an illustration, FIG. 1B is a simplified schematic of a WPT device 128 suitable for selective operation as either a TX device 102 or an RX device 108, in accordance with one or more embodiments of the present disclosure.

In particular, the WPT device 128 includes a bridge circuit 130 configured to couple with a coil 106, which may be operable as either a TX coil 106 or an RX coil 106, where the bridge circuit 130 is suitable for operation as an inverter 110 (e.g., of a TX device 102) to generate a wireless power signal 104 for transmission through a TX coil 106 or as a rectifier 114 (e.g., of an RX device 108) to convert a wireless power signal 104 received from an RX coil 106 to a DC value (VRECT). For example, the bridge circuit 130 depicted in FIG. 1B includes four transistors 132 that may be individually driven by a gate controller 134.

The WPT device 128 may further include an impedance matching circuit 118 as disclosed herein for adjusting an impedance of the associated coil. The WPT device 128 may further include a modem 122 configurable to operate in transmit and/or receive modes (e.g., for communication across the coils 106). The WPT device 128 may further include one or more measurement circuits 126 for monitoring current and/or voltage at any suitable location.

It is further contemplated herein that any combination of the components illustrated in FIG. 1B may be directly integrated into a WPT device 128 or may be external to the WPT device 128. In some embodiments, the WPT device 128 includes one or more integrated circuit (IC) chips including at least some of the components illustrated in FIG. 1B, where at least some of the components illustrated in FIG. 1B are external to the IC chips. For example, a coil 106 may be external to the WPT device 128 such that the WPT device 128 may be configured to be coupled with the coil 106.

Referring generally to FIG. 1B, it is contemplated herein that a WPT device 128 may be utilized in any device suitable for transmitting and/or receiving power via WPT techniques. For example, a WPT device 128 configured as a TX device 102 may be implemented within a wireless charging device. As another example, a WPT device 128 configured as an RX device 108 may be implemented in any device suitable for receiving power via WPT techniques including, but not limited to, mobile phones, tablets, medical implants, or toys.

Referring now generally to FIGS. 1A-2, the monitoring and/or control of preambles for in-band communication is described in greater detail in accordance with one or more embodiments of the present disclosure.

FIG. 2 is a flow diagram illustrating steps performed in a method 200, in accordance with one or more embodiments of the present disclosure. Applicant notes that the embodiments and enabling technologies described previously herein in the context of the WPT system 100 should be interpreted to extend to the method 200. It is further noted, however, that the method 200 is not limited to the architecture of the WPT system 100.

It is to be understood that the method 200 is not limited to the particular steps depicted in FIG. 2. In some embodiments, the method 200 may include additional steps, which may be performed before the depicted steps, after the depicted steps, and/or between any of the depicted steps. In some embodiments, not all of the steps depicted in FIG. 2 are performed.

In some embodiments, the method 200 includes a step 202 of measuring temporal variations of at least one of a wireless power signal 104 (e.g., a first signal), a rectified version of the wireless power signal 104 (e.g., VRECT), or a communications signal 120 (e.g., a second signal) received through a coil 106, where the wireless power signal 104 is modulatable with one or more communications signals 120 associated with one or more communication channels, and where a packet within any of the one or more second signals includes one or more first bits associated with a preamble (e.g., preamble bits) and one or more second bits associated with data (e.g., data bits).

The wireless power signal 104 may be measured at any suitable location including, but not limited to, directly across the coil 106 or another component in series with the coil 106 (e.g., a capacitor of the impedance matching circuit 118, or the like). A rectified version of the wireless power signal 104 (e.g., VRECT) may be measured at any suitable location such as, but not limited to, an output of the rectifier 114. The communications signal 120 may correspond to a filtered or otherwise modified version of the wireless power signal 104. For example, the communications signal 120 may correspond to a version of the wireless power signal 104 that has been frequency down-converted or filtered (e.g., low-pass filtered) to remove the carrier frequency. Such frequency down-conversion, filtering, or any other operation to extract the communications signal 120 may be performed by any component of the WPT device 128 including, but not limited to, the modem 122 or dedicated components. In some embodiments, the measurements associated with step 202 are generated by one or more of the measurement circuits 126.

The measurements of the temporal variations of a modulated parameter may be performed using any combination of analog or digital components. In this way, the wireless power signal 104 and/or the communications signal 120 may be digitized (e.g., using an analog to digital converter) at any point.

In some embodiments, the step 202 includes generating a measurement signal including the temporal variations. The measurement signal may include a measurement of any modulated property such as, but not limited to, amplitude (e.g., voltage) when ASK is used or frequency when FSK is used. The measurement signal may also include any type of temporal measurement known in the art including, but not limited to, a root mean square (RMS) of the modulated parameter, a maximum of the modulated parameter, a minimum of the modulated parameter, an offset value (e.g., a non-varying or direct current (DC) value), or any other suitable value. Further, the measurement signal may include temporal measurements over any selected timeframe. In a general sense, the selected timeframe associated with the temporal measurements may be adjusted based on a timeframe over which characteristics of the communications signal 120 (e.g., noise, or the like) are expected to vary. In this way, the WPT device 128 may be responsive to variations in this timeframe.

In some embodiments, the method 200 includes a step 204 of determining one or more thresholds (e.g., preamble thresholds) for distinguishing between the preamble bits and/or the data bits in a packet based on the temporal variations. The step 204 may be implemented with any component or combinations of components of the WPT device 128 such as, but not limited to, the modem controller 124.

For example, preamble thresholds associated with a communications signal 120 modulated with ASK may correspond to voltage thresholds in the WPT device 128. As another example, preamble thresholds associated with a communications signal 120 modulated with FSK may correspond to frequency thresholds in the WPT device 128.

It is contemplated herein that it may be desirable, but is not required, to set a preamble threshold to be halfway between each of bit values to provide robust detection. In this way, a two-bit modulation scheme may utilize one preamble threshold, a four-bit modulation scheme may utilize three or optionally four thresholds.

It is contemplated herein that the temporal variations associated with step 202 may provide information about a modulation depth of the communications signal 120 and/or noise in the communications signal 120 within the selected timeframe associated with the averaging.

Considering two-bit ASK modulation (e.g., binary ASK modulation, or the like) as a non-limiting example, a measurement signal based on temporal variations of a modulated parameter of the communications signal 120 may correspond to a midpoint between a first bit value (e.g., a high voltage ($V_1$)) and a second bit value (e.g., a low voltage ($V_2$) which may be, but is not required to be, zero volts) in the presence of noise. When no noise is present, the measurement signal may correspond to a midpoint between $V_1$ and $V_2$. However, the presence of noise may introduce variations in the received values that deviate from $V_1$ and $V_2$ such that intended bit values are received within ranges (e.g., $V_1 \pm \Delta_1$ and $V_2 \pm \Delta_2$ where $\Delta_1$ and $\Delta_2$ are the ranges of received values). Further, noise may impact different bit values by varying amounts such that $\Delta_1$ and $\Delta_2$ may not necessarily be equal and/or evenly distributed around $V_1$ and/or $V_2$. However, the measurement signal may still correspond to a midpoint between the ranges of received bit values such that setting the preamble threshold to the measurement signal may provide robust detection in the presence of noise.

Accordingly, in some embodiments, the step 204 includes setting the threshold (e.g., the preamble threshold) to a value of the measurement signal associated with the temporal variations of the modulated parameter.

It is further contemplated herein that the measurement signal may provide an indication of noise that may be suitable for controlling the preamble threshold for a wide variety of modulation schemes with different numbers of bit values. For example, the measurement signal may generally be indicative of a noise level (e.g., a noise measurement) associated with the communications signal 120 (e.g., a noise level in at least one of the one or more communication channels). For example, the measurement signal may have a first value in conditions without noise, but may generally increase with increasing noise. In this way, a value of the measurement signal may be correlated to a noise level. Further, changes in the measurement signal over different successive averaging timeframes may be correlated to changes in the noise level. Accordingly, the step 204 may include adjusting any number of preamble thresholds up or down as the time-varying signal moves up and down (e.g., as scaled versions of the time-varying signal, or the like).

Referring again to FIG. 2, in some embodiments, the method 200 includes a step 206 of demodulating the communications signals 120 using the one or more thresholds to identify the preamble of a packet. In some embodiments, the method 200 includes a step 208 of extracting the one or more data bits from the packet when the preamble of the packet is identified. In this way, the identification of a preamble in step 206 is a signal or a trigger to consider the following bits as data bits. The steps 206 and 208 may be implemented with any component or combinations of components of the WPT device 128 such as, but not limited to, the modem 122.

For example, the step 206 may include demodulating the communications signals 120 associated with the communication channels to search for a preamble of a packet to identify that a packet is present.

A packet may be identified in step 206 using any suitable technique. As described previously herein, a packet may include a preamble with a predefined sequence of bits. In this way, the predefined sequence of bits is known to devices on both ends of a communication channel.

In some embodiments, a packet is identified by identifying an exact match of the predefined sequence of bits when demodulating a communications signal 120 in a communication channel. For example, this may require identifying a sequence of demodulated bits (e.g., using preamble thresholds from step 204) that exactly matches the predefined sequence of bits.

In some embodiments, a packet is identified using a counter technique in which a packet may be identified based on proper demodulation of a subset of the preamble bits.

For example, an N counter technique may be implemented in which a packet may be identified based on demodulation of a selected percentage of the preamble bits As an illustration in the case of a preamble with 11 bits, this configuration may allow identification of a packet based on correct demodulation of N of the total bits (e.g., N of the 11 total preamble bits).

As another example, an N/M counter technique may be implemented in which a packet may be identified based on correct demodulation of N out of M sequential bits of the preamble, where N<M and M is equal to or less than the total number of bits in the preamble. As an illustration in the case of a preamble with 11 bits with N=9 and M=10, this configuration may allow identification of a packet based on correct demodulation of 9 out of any 10 sequential bits. As an illustration in the case of a preamble with 11 bits with N=6 and M=8, this configuration may allow identification of a packet based on correct demodulation of 6 out of any 8 sequential bits. In general, this technique may allow for control of the values of the length of sequential bits analyzed (M) and the number of allowed errors (M-N).

It is contemplated herein that counter-based techniques (e.g., an N counter technique, an N/M counter technique, or the like) may allow for increased overall robustness in the presence of noise since the requirement for identifying a packet is relaxed. For example, requiring an exact match of preamble bits for identification of a packet may result in a relatively high number of dropped packets in the presence of noise. However, such counter techniques may allow packet identification even in the presence of noise. It is further contemplated herein that while this technique may potentially result in some improperly identified packets, the benefit of fewer dropped packets may outweigh negative impacts of improperly identified packets.

In some embodiments, a packet is identified using a correlation technique in which demodulated bits are correlated to an expected preamble pattern, where an error tolerance may be controlled based on parameters such as, but not limited to, length (e.g., of preamble pattern) and threshold values (e.g., a value of a correlation operation required to consider a packet properly identified).

It is contemplated herein that the robustness of step 206 may be impacted by the choice of preamble (e.g., the choice of the predefined series of bits, the preamble pattern, or the like). In some embodiments, the preamble includes a simple sequence of alternating bits with two bit values (e.g., corresponding to a pattern of "101010 . . . "), which may conform to at least one standard or protocol. However, it is further contemplated herein that such a sequence may not facilitate robust detection of a packet. For example, depending on the selected length of the preamble, such a pattern may be the result of natural fluctuations in the communication channel (e.g., noise) when no packets are being transmitted. As an illustration, consider a preamble with a bit sequence of "10101010" where a received demodulated pattern includes "10111010." In this case, it may be unclear whether the fourth bit was improperly demodulated because of noise (e.g., the transmitted sequence was "10101010") or whether the fifth bit is the intended start of a packet where the remaining bits are not yet received. In contrast, a random or pseudo-random sequence of bits may be more readily identifiable, particularly when using preamble detection techniques based correct demodulation of only a subset of the preamble pattern such as, but not limited to, a counter technique or a correlation technique. This sequence of bits is also problematic because it may require evaluation of the actual data sequence to find the first bit of the packet. In some embodiments, the preamble includes at least one of a random sequence of bits or a pseudo-random sequence of bits. In this way, the preamble sequence as well as the start of the subsequent data bits may be more readily identified.

Referring again generally to FIG. 2, the method may further include waiting a buffer interval (e.g., buffering) prior to demodulating the communications signals 120 using the one or more thresholds to identify the preamble of a packet. Put another way, bits of a communications signal 120 may be buffered for the buffer interval prior to demodulation. In this configuration, the steps 202 and 204 may be performed (or at least partially performed) during the buffer interval based on past and/or future bits of the communications signal 120 such that preamble detection thresholds may be dynamically adjusted for each particular bit (or series of bits) based on the particular characteristics of the communications channel during transmission of the particular bit (or series of bits). The buffer interval may be any suitable time associated with any number of past or future bits to consider, which may in turn be related to the baud rate In some embodiments, the buffer interval is in a range of 4-6 bits. For instance, the buffer interval may include two past bits and two future bits relative to a particular bit being demodulated. However, this example is merely illustrative and should not be interpreted as limiting and any buffer interval may be utilized. In a general sense, increasing a duration of the buffer interval may increase an accuracy and/or robustness of the determination of the preamble detection thresholds (e.g., in steps 202 and 204), but may increase a latency associated with the communication. In this way, the value may be selected to balance the accuracy and/or robustness with the latency of the communication.

In some embodiments, the method 200 may include a step 210 of transmitting a request to modify one or more parameters associated with modulation and/or demodulation of the communications signal 120 including, but not limited to, a number of bits in the preamble, values of bits in the preamble (e.g., a preamble pattern), a modulation depth, or a baud rate, or a buffer duration. Such a request may be made by either the TX device 102 or the RX device 108 for communication in either direction. For example, one WPT device 128 may generate a communications signal 120 for communication through the coil 106 to a corresponding WPT device 128 with a corresponding coil 106, where data bits of this communications signal 120 include the request and associated parameters to be modified. In this way, the modem 122 and/or the modem controller 124 of the corresponding WPT device 128 may receive the request based on demodulation with current values of the preamble or modulation depth and make associated adjustments for future communications signals 120.

A request to modify at least one of the preamble or a modulation depth of the communications signal 120 may be made for any reason. As one example, such a request may be made based upon a noise level in a communications channel (e.g., associated with temporal variations measured in step 202) to ensure a sufficient margin for detecting the preamble and/or data.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A device comprising:
a first circuit configured to be coupled with a coil and at least one of transmit or receive a first signal providing wireless power through the coil, wherein the first signal is further modulated with one or more second signals associated with one or more communication channels through the coil, wherein a packet within any of the one or more second signals includes one or more first bits associated with a preamble and one or more second bits associated with data; and
a controller configured to:
measure temporal variations of at least one of the first signal, a rectified version of the first signal, or the one or more second signals; and
determine one or more thresholds for distinguishing between at least one of the one or more first bits or the one or more second bits in the packet based on the temporal variations during a buffer interval; and
a second circuit configured to:
demodulate the one or more second signals using the one or more thresholds to identify the preamble of the packet; and
extract the one or more second bits associated with the data from the packet in response to identifying the preamble of the packet;
wherein the modem is further configured to wait the buffer interval prior to demodulating the one or more second signals using the one or more thresholds to identify the preamble of the packet.

2. The device of claim 1, wherein the one or more first signals are modulated by amplitude shift keying (ASK) to provide the one or more second signals, wherein the threshold is a voltage threshold.

3. The device of claim 1, wherein the one or more first signals are modulated by frequency shift keying (FSK) to provide the one or more second signals, wherein the threshold is a frequency threshold.

4. The device of claim 3, wherein the preamble includes a predefined sequence of bits.

5. The device of claim 4, wherein demodulating the one or more second signals using the one or more thresholds to identify the preamble of the packet comprises:
identifying an exact match of the predefined sequence of bits.

6. The device of claim 4, wherein demodulating the one or more second signals using the one or more thresholds to identify the preamble of the packet comprises:
identifying a subset of the predefined sequence of bits.

7. The device of claim 4, wherein the predefined sequence of bits comprises:
an alternating sequence of bits with two bit values.

8. The device of claim 4, wherein the predefined sequence of bits comprises:
a sequence of at least one of random or pseudo-random bit values.

9. The device of claim 1, wherein the controller is further configured to:
transmit a request to modify parameters associated with at least one of modulation or demodulation of the communications signal.

10. The device of claim 9, wherein the temporal variations of at least one of the first signal, the rectified version of the first signal, or the second signal are indicative of a noise level associated with at least one of the one or more communication channels, wherein the controller is configured to transmit the request to in response to the noise measurement.

11. The device of claim 1, wherein the buffer interval corresponds to at least two bits at a baud rate of the one or more second signals.

12. The device of claim 1, wherein the controller is further configured to determine a baud rate of the one or more second signals, wherein the modem is further configured to demodulate the one or more second signals in the communication channel using the one or more thresholds to identify the preamble at the baud rate.

13. A device comprising:
a first circuit configured to be coupled with a coil and at least one of transmit or receive a first signal providing wireless power through the coil, wherein the first signal is further modulated with one or more second signals associated with one or more communication channels through the coil, wherein a packet within any of the one or more second signals includes one or more first bits associated with a preamble and one or more second bits associated with data;
a rectifier configured to generate a rectified version of the first signal;
a controller configured to:
measure temporal variations of at least one of the first signal, the rectified version of the first signal, or the one or more second signals; and
determine one or more thresholds for distinguishing between at least one of the one or more first bits or the one or more second bits in the packet based on the temporal variations during a buffer interval; and
a second circuit configured to:
demodulate the one or more second signals using the one or more thresholds to identify the preamble of the packet; and
extract the one or more second signals associated with the data from the packet in response to identifying the preamble of the packet;
wherein the modem is further configured to wait the buffer interval prior to demodulating the one or more second signals using the one or more thresholds to identify the preamble of the packet.

14. The device of claim 13, wherein the one or more first signals are modulated by amplitude shift keying (ASK) to provide the one or more second signals, wherein the threshold is a voltage threshold.

15. The device of claim 13, wherein the one or more first signals are modulated by frequency shift keying (FSK) to provide the one or more second signals, wherein the threshold is a frequency threshold.

16. The device of claim 13, wherein the preamble includes a predefined sequence of bits, wherein demodulating the one or more second signals using the one or more thresholds to identify the preamble of the packet comprises:
identifying an exact match of the predefined sequence of bits.

17. The device of claim 13, wherein the preamble includes a predefined sequence of bits, wherein demodulating the one or more second signals using the one or more thresholds to identify the preamble of the packet comprises:
identifying a subset of the predefined sequence of bits.

18. A method comprising:
receiving a first signal providing wireless power through a coil, wherein the first signal is further modulated with one or more second signals associated with one or more communication channels through the coil, wherein a packet within any of the one or more second signals includes one or more first bits associated with a preamble and one or more second bits associated with data;

measuring temporal variations of at least one of the first signal, a rectified version of the first signal, or the one or more second signals;

determining one or more thresholds for distinguishing between at least one of the one or more first bits or the one or more second bits in the packet based on the temporal variations during a buffer interval;

demodulating the one or more second signals using the one or more thresholds to identify the preamble of the packet; and extracting the one or more second bits associated with the data from the packet in response to identifying the preamble of the packet;

wherein the modem is further configured to wait the buffer interval prior to demodulating the one or more second signals using the one or more thresholds to identify the preamble of the packet.

* * * * *